(12) United States Patent
Lee

(10) Patent No.: US 10,315,062 B2  
(45) Date of Patent: Jun. 11, 2019

(54) WEARABLE SOFT EXOSKELETON APPARATUS

(71) Applicant: FRT Co., Ltd., Pohang-si, Gyeongsangbuk-do (KR)

(72) Inventor: Dong-Chan Lee, Seoul (KR)

(73) Assignee: FRT CO., LTD., Pohang-si, Gyeongsangbuk-do (KR)

( * ) Notice: Subject to any disclaimer, the term of this patent is extended or adjusted under 35 U.S.C. 154(b) by 358 days.

(21) Appl. No.: 15/393,694

(22) Filed: Dec. 29, 2016

(65) Prior Publication Data

US 2018/0021618 A1 Jan. 25, 2018

(30) Foreign Application Priority Data

Jul. 25, 2016 (KR) .................. 10-2016-0094159

(51) Int. Cl.
*A61H 3/00* (2006.01)
*A61H 1/02* (2006.01)
*B25J 9/00* (2006.01)
*B25J 9/14* (2006.01)
*A63B 21/00* (2006.01)

(52) U.S. Cl.
CPC ..... *A63B 21/00181* (2013.01); *A61H 1/0237* (2013.01); *A61H 3/00* (2013.01); *A61H 1/0262* (2013.01); *A61H 2201/1238* (2013.01); *A61H 2201/165* (2013.01); *A61H 2201/1652* (2013.01); *A61H 2201/1683* (2013.01); *A61H 2201/5051* (2013.01); *A61H 2201/5061* (2013.01); *A61H 2201/5071* (2013.01); *B25J 9/0006* (2013.01); *B25J 9/142* (2013.01)

(58) Field of Classification Search
CPC combination set(s) only.
See application file for complete search history.

(56) References Cited

U.S. PATENT DOCUMENTS

| 4,792,173 A | * | 12/1988 | Wilson | B25J 9/1075 |
| | | | | 294/119.3 |
| 7,056,297 B2 | * | 6/2006 | Dohno | A63B 21/00181 |
| | | | | 310/316.01 |
| 2003/0110938 A1 | * | 6/2003 | Seto | B25J 9/142 |
| | | | | 92/92 |

(Continued)

FOREIGN PATENT DOCUMENTS

KR 10-1315199 B1 10/2013

*Primary Examiner* — Thomas Sweet
*Assistant Examiner* — Javier G Blanco
(74) *Attorney, Agent, or Firm* — Rabin & Berdo, P.C.

(57) ABSTRACT

A wearable soft exoskeleton apparatus includes: a fluid supplying portion; and a soft exoskeleton portion which is connected to the fluid supplying portion and is configured to be able to be worn in legs of a user, a soft exoskeleton portion being made of elastic material to simulate motions of the legs and being provided with a fiber conduit through which fluid flows, the soft exoskeleton portion being inflated to support the legs of the user when the fluid is supplied to the fiber conduit from the fluid supplying portion. The soft exoskeleton portion includes: a fiber tube which is formed in a mesh type to be able to enclose a femoral region and a shinbone; and a fiber structure which is disposed within the fiber tube in a structure in which cells of a predetermined shape are connected to one another so as to form a plurality of the fiber conduits therein.

3 Claims, 5 Drawing Sheets

(56) References Cited

U.S. PATENT DOCUMENTS

| | | | |
|---|---|---|---|
| 2004/0158175 A1* | 8/2004 | Ikeuchi | A61H 3/008 601/5 |
| 2006/0142105 A1* | 6/2006 | Kudoh | A61H 1/0237 475/10 |
| 2006/0161220 A1* | 7/2006 | Kobayashi | A61F 5/0102 607/49 |
| 2006/0249017 A1* | 11/2006 | Hiramatsu | A61H 1/0237 92/89 |
| 2009/0085444 A1* | 4/2009 | Alvarez Icaza Rivera | H01L 41/0478 310/365 |
| 2009/0255531 A1* | 10/2009 | Johnson | A61F 5/24 128/99.1 |
| 2011/0005160 A1* | 1/2011 | Nihei | B25J 9/1075 52/645 |
| 2011/0105966 A1* | 5/2011 | Kazerooni | A61H 3/008 601/35 |
| 2014/0030455 A1* | 1/2014 | Ruschulte | B25J 9/1075 428/35.2 |
| 2014/0277739 A1* | 9/2014 | Kornbluh | B25J 9/0006 700/260 |

\* cited by examiner

WEARABLE SOFT EXOSKELETON APPARATUS

CROSS-REFERENCE TO RELATED APPLICATION

This application claims priority to and the benefit of Korean Patent Application No. 10-2016-0094159 filed in the Korean Intellectual Property Office on Jul. 25, 2016, the entire contents of which are incorporated herein by reference.

TECHNICAL FIELD

The present invention relates to a wearable soft exoskeleton apparatus.

BACKGROUND ART

Recently, wearable robots which can assist person's movements are widely being developed. Such wearable robots are used as various applications such as an industrial application, a medical application, a military application or the like.

Such a wearable robot for assisting muscular power includes a power assisting robot for the upper body and a power assisting robot for the lower body. The robot for the lower body among these is a robot assisting power of legs, and may be configured to detect walking conditions of a user and to assist the muscular power depending the detected conditions.

However, since the power assisting robot for the lower body is generally formed by a metallic frame which is powered by mechanical forces, weight and volume thereof are inevitably increased and thus it is difficult to realize rapid movements and smooth motions.

Also, due to these reasons, it may cause exhaustion of physical strength of a user and movements are restricted.

DETAILED DESCRIPTION OF THE INVENTION

Technical Problem

The present invention has been made in an effort to provide a wearable soft exoskeleton apparatus which is made of metamaterial which has a negative Poisson's Ratio or phase-change characteristics so that it has minimized weight and volume and can be tightly fitted onto a body of a user so as to allow smooth movements.

Technical Solution

A wearable soft exoskeleton apparatus according to an embodiment of the present invention includes: a fluid supplying portion; and a soft exoskeleton portion which is connected to the fluid supplying portion and is configured to be able to be worn in legs of a user, a soft exoskeleton portion being made of elastic material to simulate motions of the legs and being provided with a fiber conduit through which fluid flows, the soft exoskeleton portion being inflated to support the legs of the user when the fluid is supplied to the fiber conduit from the fluid supplying portion. The soft exoskeleton portion includes: a fiber tube which is formed in a mesh type to be able to enclose a femoral region and a shinbone; and a fiber structure which is disposed within the fiber tube in a structure in which cells of a predetermined shape are connected to one another so as to form a plurality of the fiber conduits therein.

The fluid supplying portion may include: a fluid supplying device which supplies the fluid to the soft exoskeleton or withdraws the fluid from the soft exoskeleton; and a wearing portion which is configured to mount the fluid supplying device to a body of the user.

The fluid supplying device may include: a mounting portion to which the wearing portion and the soft exoskeleton portion are coupled; a hydraulic pressure module which is mounted to the mounting portion and generates a hydraulic pressure; and a fluid supplying tube which connects the hydraulic pressure module and the soft exoskeleton portion together.

The wearing portion may include: a first supporting portion which is coupled to the fluid supplying device and is configured to be able to be worn in a waist of the user; and a second supporting portion which is coupled to the fluid supplying device and is configured to be able to be worn in a shoulder of the user.

The soft exoskeleton portion may include: a first soft exoskeleton link which is configured to be able to support the femoral region; a second soft exoskeleton link which is configured to be able to support the shinbone; a detection portion which is configured to be able to support feet of the user and detects movements of the user to control an operation of the fluid supplying portion; and a joint portion which connects the fluid supplying portion, the first soft exoskeleton link, the second soft exoskeleton link and the detection portion to be rotatable with respect to one another.

The soft exoskeleton portion further may include a fixing device which fixes the first soft exoskeleton link, the second soft exoskeleton link and the detection portion to a body of the user.

The detection portion may include: a first supporting portion which is rotatably connected to the second soft exoskeleton link to support an ankle of the user; and a second supporting portion which is configured to be disposed at a sole of a foot and is provided with a plurality of pressure sensors.

The elastic material may be metamaterial which has a negative Poisson's Ratio or phase-change characteristics.

Advantageous Effects

According to the present invention, since the soft exoskeleton portion which is worn in a body of a user is made of elastic metamaterial which has a negative Poisson's Ratio or phase-change characteristics, weight and volume thereof can be minimized, and the soft exoskeleton portion can precisely imitate motions of legs so as to ensure rapid and smooth movements.

Further, since the soft exoskeleton portion is formed in a structure of the fiber tube which can be expanded and contracted depending on flow of the fluid and has a mesh type enclosing the femoral region and the shinbone of a user, the soft exoskeleton can support a body of a user effectively and can protect the femoral region and the shinbone from external shocks.

Further, since a plurality of the pressure sensors which can be easily attached to and detached from a body of a user and detects pressure by a sole of a user to control the fluid supplying device are disposed, the soft exoskeleton portion can be worn without making a user feel discomfort and it can be rapidly detected whether the assisting power is required or not so that a user can make precise movements according to his intention.

DETAILED DESCRIPTION OF THE EMBODIMENTS

An embodiment of the present invention will be described in detail with reference to the accompanying drawings hereinafter.

Figure 1:
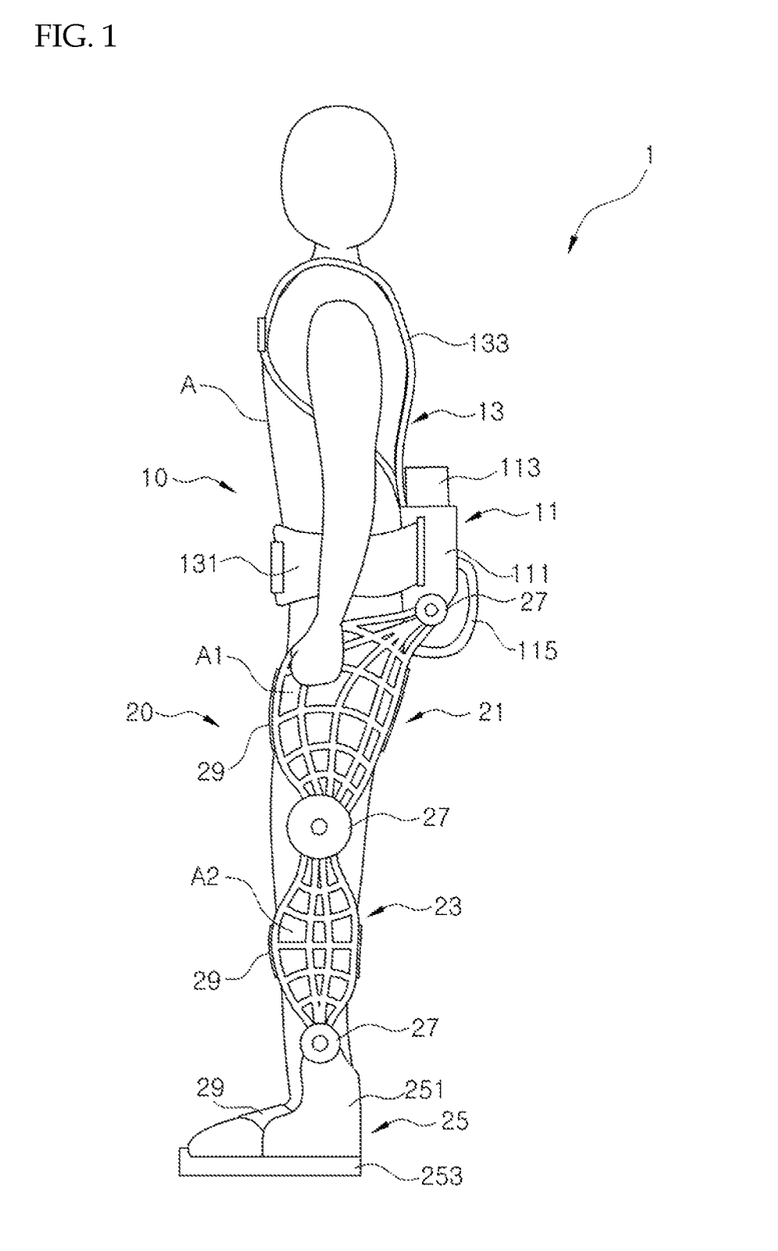
FIG. 1 is a drawing showing a state that a user wears a wearable soft exoskeleton apparatus according to an embodiment of the present invention.
Figure 2:
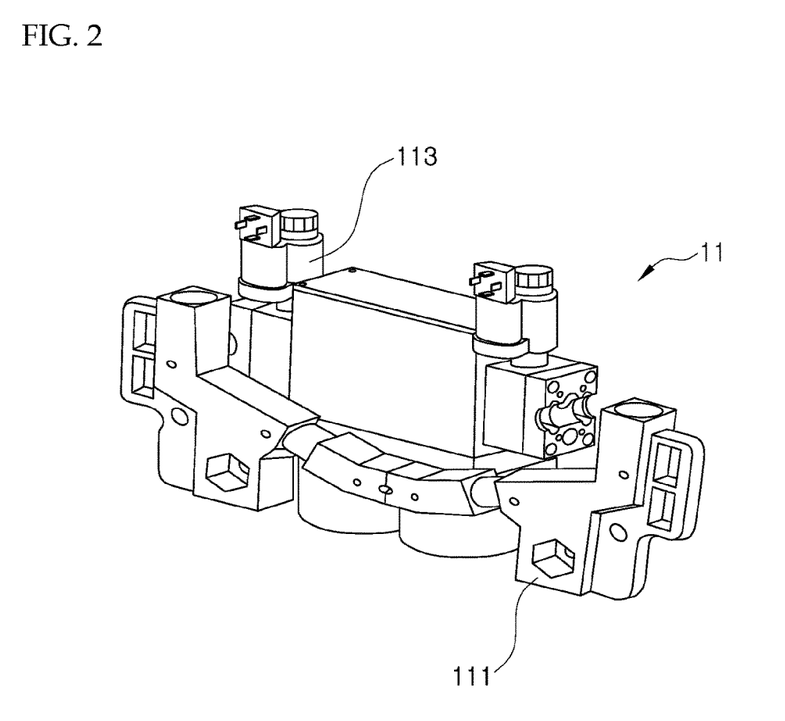
FIG. 2 is a drawing schematically showing a fluid supplying device of a wearable soft exoskeleton apparatus according to an embodiment of the present invention.
Figure 3:
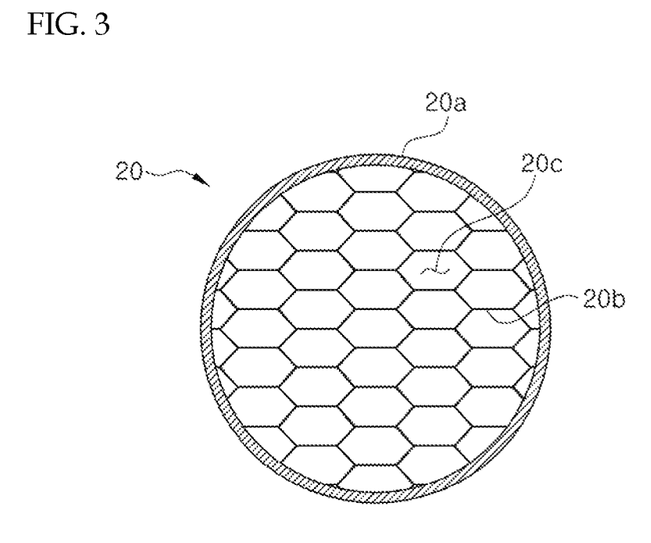
FIG. 3 is a drawing schematically showing a section of a soft exoskeleton portion of a wearable soft exoskeleton apparatus according to an embodiment of the present invention.
Figure 4:
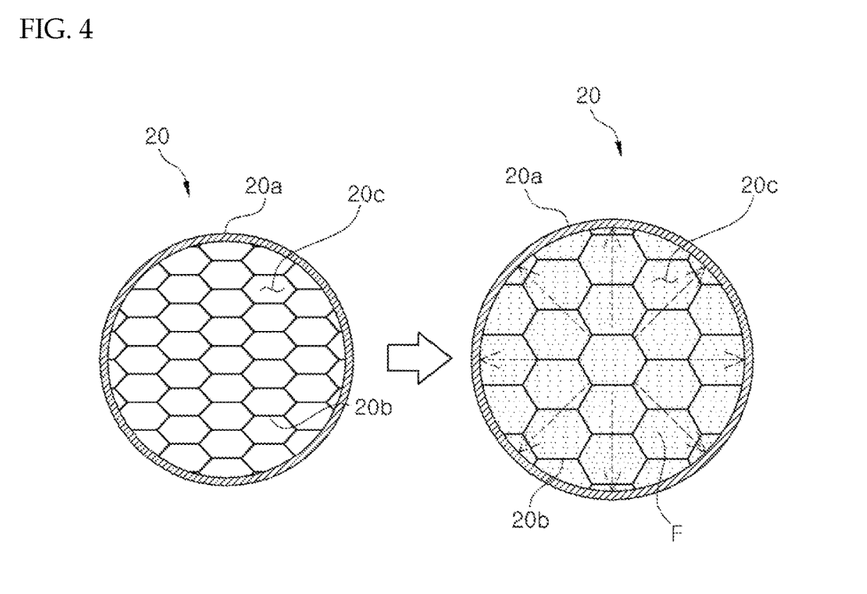
FIG. 4 is a drawing schematically showing changes of a soft exoskeleton portion by fluid supply.
Figure 5:
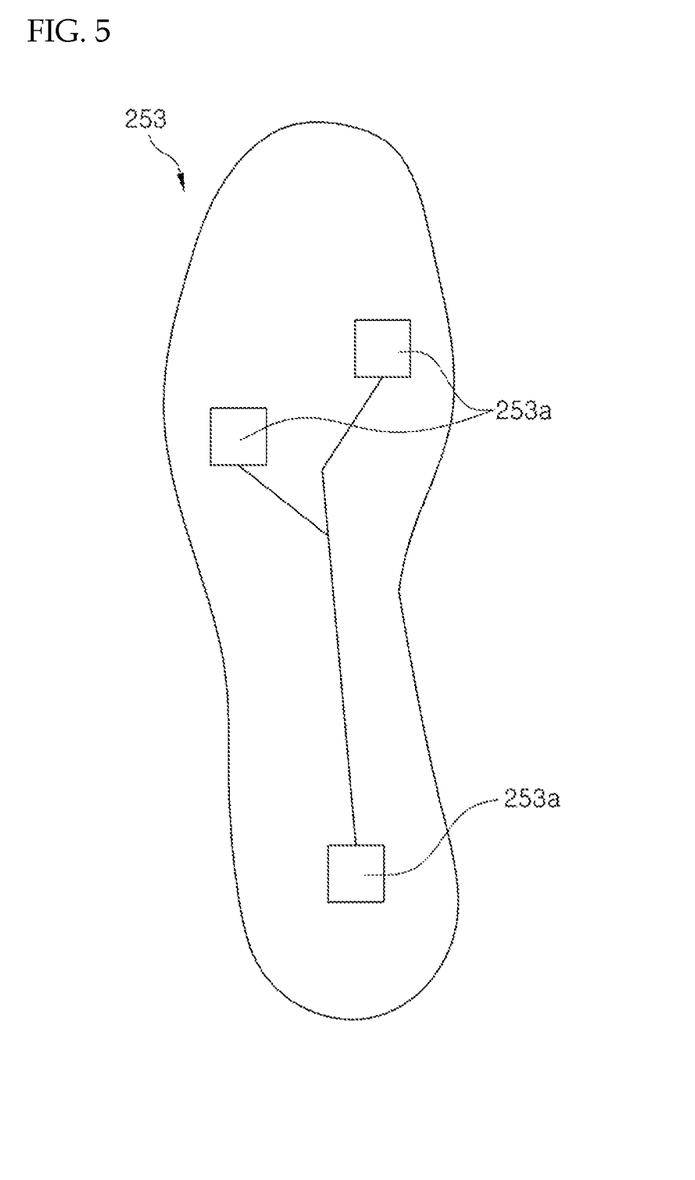
FIG. 5 is a drawing schematically showing disposition of pressure sensors on a second supporting portion of a wearable soft exoskeleton apparatus according to an embodiment of the present invention.

FIG. 1 is a drawing showing a state that a user wears a wearable soft exoskeleton apparatus according to an embodiment of the present invention, FIG. 2 is a drawing schematically showing a fluid supplying device of a wearable soft exoskeleton apparatus according to an embodiment of the present invention, and FIG. 3 is a drawing schematically showing a section of a soft exoskeleton portion of a wearable soft exoskeleton apparatus according to an embodiment of the present invention. Also, FIG. 4 is a drawing schematically showing changes of a soft exoskeleton portion by fluid supply, and FIG. 5 is a drawing schematically showing disposition of pressure sensors on a second supporting portion of a wearable soft exoskeleton apparatus according to an embodiment of the present invention.

Referring to FIG. 1, a wearable soft exoskeleton apparatus 1 according to an embodiment of the present invention is formed by elastic metamaterial which has a negative Poisson's Ratio or phase-change characteristics instead of metallic frame and mechanical structure so as to be small-sized and flexible, and includes a fluid supplying portion 10.

The fluid supplying portion 10 is worn in a body of a user A and is connected to a soft exoskeleton portion 20, and regulates inflow of fluid to the soft exoskeleton portion 20, pressure of the fluid, speed of the fluid, and the like.

In detail, the fluid supplying portion 10 may include a fluid supplying device 11 and a wearing portion 13.

The fluid supplying device 11 supplies fluid to the soft exoskeleton portion 20 or withdraws fluid from the soft exoskeleton 20.

Referring to FIG. 1 and FIG. 2, the fluid supplying device 11 may include a mounting portion 111 to which the wearing portion 13 and the soft exoskeleton portion 20 are coupled. The mounting portion 111 is disposed at a waist of a user A by the wearing portion 13 and has a securing groove (not shown) to secure a hydraulic pressure module 113. Also, coupling means which are configured to be coupled to the wearing portion 13 and the soft exoskeleton portion 20 may be provided at an outer periphery thereof. For example, the coupling means may be a hook or a groove.

Further, the fluid supplying device 11 may include the hydraulic pressure module 113 which is mounted to the mounting portion 111 and generates a hydraulic pressure. For example, the hydraulic module 113 may be formed by a hydraulic pressure tank, a hydraulic pressure driving motor, a hydraulic pressure valve, a hydraulic pressure pump gear, a driving circuit board, a battery pack and the like. The hydraulic pressure module 113 may have an integrated hydraulic pressure supplying type in which a plurality of hydraulic driving motors, hydraulic pressure valves and hydraulic pressure pump gears are installed in one hydraulic pressure tank.

Also, the fluid supplying device 11 may include a fluid supplying tube 115 which connects the hydraulic pressure module 113 and the soft exoskeleton portion 20. For example, the fluid supplying tube 115 may be formed as one through which supplying and discharging of fluid are performed simultaneously or may be formed as plural through which supplying and discharging of fluid are performed separately.

The wearing portion 13 may fix the fluid supplying device 11 to a body of a user A.

Referring to FIG. 1, the wearing portion 13 may include a first supporting portion 131 which is coupled to the mounting portion 111 of the fluid supplying device 11 and is configured to be able to be worn in a waist of a user A and a second supporting portion 133 which is coupled to the mounting portion 111 of the fluid supplying device 11 and is configured to be able to be worn in a shoulder of a user A. For example, a connector of one-touch type and a length regulator (not shown) may be provided to the first supporting portion 131 and the second supporting portion 133.

Meanwhile, the wearable soft exoskeleton apparatus 1 includes the soft exoskeleton portion 20.

Referring to FIG. 1 and FIG. 3, the soft exoskeleton portion 20 is connected to the fluid supplying portion 10 to be worn to legs of a user A and is formed of flexible material so as to imitate motions of legs. The soft exoskeleton portion 20 is provided with a fiber conduit 20c through which fluid flows and is inflated to support legs of a user A when fluid is supplied thereto from the fluid supplying portion.

In more detail, the soft exoskeleton portion 20 includes a fiber tube 20a which has the fiber conduit 20c therein and a fiber structure 20b which is disposed inside the fiber tube 20a to form a plurality of the fiber conduits 20c.

The fiber tube 20a is disposed in a mesh type to be able to enclose a femoral region A1 and a shinbone A2, and is formed of elastic material so as to undergo expansion and contraction together with the fiber structure 20b. For example, the fiber tube 20a may be formed of elastic material together with the fiber structure 20b, but may be thicker than the fiber structure 20b or may be formed of material containing non-elastic component so that an inflation thereof can be limited within a predetermined critical value when the fluid flows thereinto.

The fiber structure 20b is disposed within the fiber tube 20a in a structure in which cells of a predetermined shape are connected to one another so as to form a plurality of the fiber conduits 20c therein. For example, the shape of the cells forming the fiber structure 20b may be a shape of a honeycomb, reentrant hexagonal honeycomb, arrow head, spiral airbag or the like, and the cells forming the fiber structure 20b may have the same size or may also have different sizes depending on pressures of fluid or positions.

That is, as shown in FIG. 4, the soft exoskeleton portion 20 may perform the same processes as contraction and relaxation of muscles to imitate motions of legs. For example, the soft exoskeleton portion 20 may suitably supply fluid to the fiber conduit 20c by the fluid supplying device 11 or withdraw fluid therefrom so as to regulate width and length of the soft exoskeleton portion 20. In more detail, in case of imitating a contraction state of muscles, the fluid is supplied such that the length of the soft exoskeleton portion 20 is reduced and the width thereof is increased, and on the other hand in case of imitating relaxation state of muscles, the fluid is withdrawn such that that the length of the soft exoskeleton portion 20 is increased and the width thereof is reduced. Accordingly, in case that it is needed to assist the muscle power, the fluid F is supplied to the fiber conduit 20c from the fluid supplying device 11 to inflate the soft exoskeleton portion 20 to support legs of a user A, and on the contrary in case that it is not needed to assist the muscle power, the fluid F supplied to the fiber conduit 20c form the fluid supplying device 11 is withdrawn so as to relax the soft exoskeleton portion 20 such that a user A can freely move his legs.

At this time, the elastic material forming the soft exoskeleton portion 20 may be metamaterial which has a negative Poisson's Ratio or phase-change characteristics.

Further, the soft exoskeleton portion 20 may include a first soft exoskeleton link 21 which is configured to be able to support the femoral region A1, a second soft exoskeleton link 23 which supports the shinbone A2 and a joint portion 27 which connects the fluid supplying portion 10, the first soft exoskeleton link 21 and the second soft exoskeleton link 23 to be rotatable with respect to one another.

Accordingly, in the soft wearable exoskeleton apparatus 1, the soft exoskeleton portion 20 is divided into plural portions to support respective body parts and also the divided soft exoskeleton links 21 and 23 are connected by the joint portion 27 so that a user A can smoothly move his legs. Further, the soft wearable exoskeleton apparatus 1 is formed not only to assist muscle powers of the femoral region A1 and the shinbone A2, but also to enclose the femoral region A1 and the shinbone A2 so as to absorb shocks from the outside.

Furthermore, the soft exoskeleton portion 20 may include a detection portion 25 which is rotatably connected to the second soft exoskeleton link 23 via the joint portion 27 to support feet of a user A and detects movements of a user A to control an operation of the fluid supplying portion 10.

Referring to FIG. 1 and FIG. 5, the detection portion 25 may include a first supporting portion 251 which is rotatably connected to the second soft exoskeleton link 23 to support an ankle of a user A and a second supporting portion 253 which is configured to be disposed at a sole of a foot and is provided with a plurality of pressure sensors 253a.

That is, in case that a foot of a user A is rested on the second supporting portion 253 so that pressure is applied to the pressure sensors 253a, a pressure signal is transmitted to a driving circuit board which is installed on the fluid supplying device 11 and subsequently a hydraulic pressure driving motor is driven, and thus the hydraulic pressure valve of the hydraulic pressure tank is opened and thus the fluid of high pressure is supplied via the fluid supplying tube 115 which is connected to the hydraulic pressure module 113 and the soft exoskeleton portion 20. On the contrary, in case that a pressure signal becomes lower than a predetermined critical value, the driving circuit board determines that load due to a user's motion does not apply any more, and accordingly closes the hydraulic pressure valve and withdraws the fluid which has been supplied to the soft exoskeleton portion 20.

Also, the soft exoskeleton portion 20 may further include a fixing device which fixes the first soft exoskeleton link 21, the second soft exoskeleton link 23 and the detection portion 25 to a body of a user A.

For example, the fixing device 29 may be formed in strap structures which are respectively provided to the first soft exoskeleton link 21, the second soft exoskeleton link 23 and the detection portion 25 to enclose respective ports of a body, and may fix the first soft exoskeleton link 21, the second exoskeleton link 23 and the detection portion 25 to a femoral region A1, a shinbone A2, an ankle and a top of a foot of a user A.

As such, according to the present invention, since the soft exoskeleton portion 20 which is worn in a body of a user A is made of elastic metamaterial which has a negative Poisson's Ratio or phase-change characteristics, weight and volume thereof can be minimized, and the soft exoskeleton portion 20 can precisely imitate motions of legs so as to ensure rapid and smooth movements.

Further, since the soft exoskeleton portion 20 is formed in a structure of the fiber tube 20a which can be expanded and contracted depending on flow of the fluid and has a mesh type enclosing the femoral region A1 and the shinbone A1 of a user A, the soft exoskeleton 20 can support a body of a user A effectively and can protect the femoral region A1 and the shinbone A2 from external shocks.

Further, since a plurality of the pressure sensors 253a which can be easily attached to and detached from a body of a user A and detects pressure by a sole of a user A to control the fluid supplying device 11 are disposed, the soft exoskeleton portion 20 can be worn without making a user A feel discomfort and it can be rapidly detected whether the assisting power is required or not so that a user A can make precise movements according to his intention.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A wearable soft exoskeleton apparatus comprising:
a fluid supplying portion; and
a soft exoskeleton portion which is connected to the fluid supplying portion and is configured to be able to be worn in legs of a user, the soft exoskeleton portion being made of elastic material to simulate motions of the legs and being provided with a plurality of fiber conduits through which fluid flows, the soft exoskeleton portion being inflated to support the legs of the user when the fluid is supplied to the plurality of fiber conduits from the fluid supplying portion,
wherein the fluid supplying portion comprises:
a fluid supplying device which supplies the fluid to the soft exoskeleton portion or withdraws the fluid from the soft exoskeleton portion; and
a wearing portion which is configured to mount the fluid supplying device to a body of the user;
wherein the fluid supplying device comprises:
a mounting portion to which the wearing portion and the soft exoskeleton portion are coupled;

a hydraulic pressure module which is mounted to the mounting portion and generates a hydraulic pressure; and a fluid supplying tube which connects the hydraulic pressure module and the soft exoskeleton portion together;

wherein the wearing portion comprises:

a first supporting portion which is coupled to the fluid supplying device and is configured to be able to be worn in a waist of the user; and a second supporting portion which is coupled to the fluid supplying device and is configured to be able to be worn in a shoulder of the user;

wherein the soft exoskeleton portion comprises:

a fiber tube which is formed in a mesh type to be able to enclose a femoral region and a shinbone and which can be expanded and contracted depending on flow of the fluid;

a fiber structure which is disposed within the fiber tube in a structure in which structural cells of a predetermined shape are connected to one another so as to form said plurality of fiber conduits therein;

a first soft exoskeleton link which is configured to be able to support the femoral region;

a second soft exoskeleton link which is configured to be able to support the shinbone;

a detection portion which is configured to be able to support feet of the user and detects movements of the user to control an operation of the fluid supplying portion; and a joint portion which connects the fluid supplying portion, the first soft exoskeleton link, the second soft exoskeleton link and the detection portion to be rotatable with respect to one another;

wherein the elastic material is a metamaterial which has a negative Poisson's Ratio or phase-change characteristics; and wherein the predetermined shape of the structural cells is selected from the group consisting of honeycomb, reentrant hexagonal honeycomb, arrow head, or spiral airbag.

2. The wearable soft exoskeleton apparatus of claim 1, wherein the soft exoskeleton portion further comprises a fixing device which fixes the first soft exoskeleton link, the second soft exoskeleton link and the detection portion to a body of the user.

3. The wearable soft exoskeleton apparatus of claim 1, wherein the detection portion comprises:

a first supporting portion which is rotatably connected to the second soft exoskeleton link to support an ankle of the user; and a second supporting portion which is configured to be disposed at a sole of a foot and is provided with a plurality of pressure sensors.

* * * * *